Aug. 31, 1965 A. VANESIAN 3,203,648
MEANS FOR REMOVING BOUNDARY LAYER AIR FROM AIRCRAFT
Filed Dec. 26, 1961
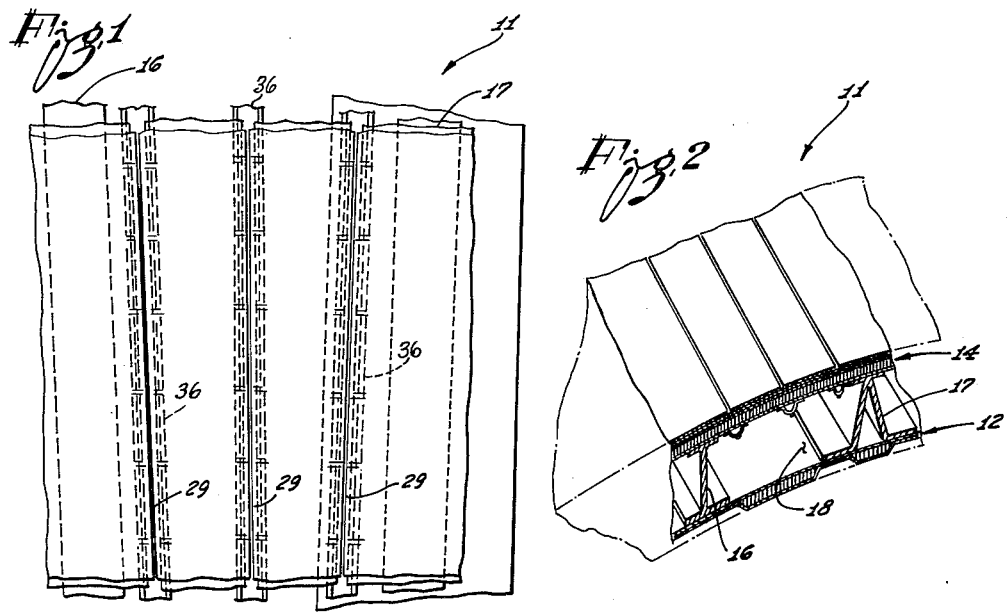
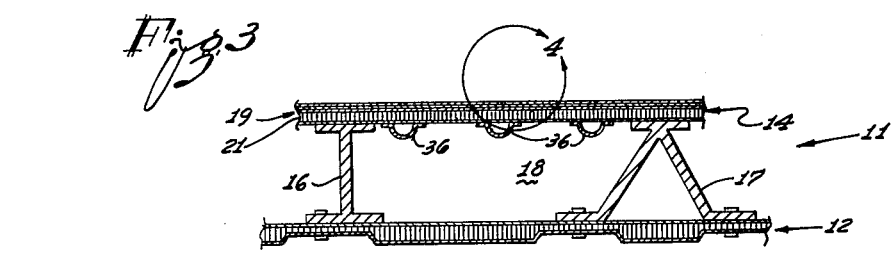
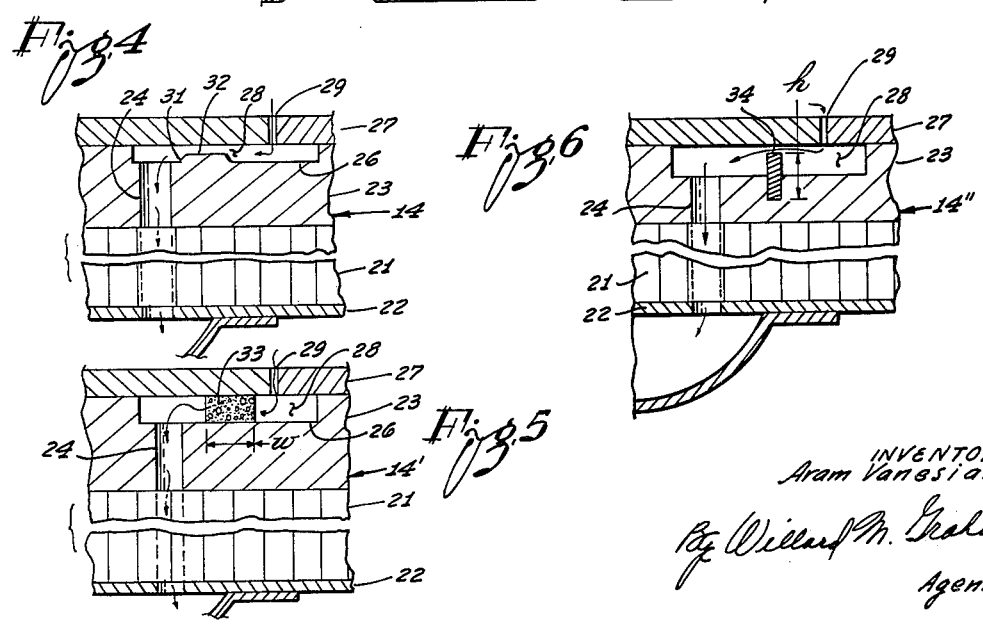
INVENTOR.
Aram Vanesian
By Willard M. Graham
Agent

United States Patent Office 3,203,648
Patented Aug. 31, 1965

---

3,203,648
MEANS FOR REMOVING BOUNDARY LAYER AIR FROM AIRCRAFT
Aram Vanesian, Rolling Hills, Calif., assignor to Northrop Corporation, Beverly Hills, Calif., a corporation of California
Filed Dec. 26, 1961, Ser. No. 162,142
11 Claims. (Cl. 244—42)

This invention pertains to means for removing boundary layer air from aircraft and more particularly to structural assemblies, therefore incorporating means for selectively removing predetermined quantities of boundary layer air from the external surfaces of the assemblies.

Means adapted to remove boundary layer air from the external surfaces of aircraft structures has been disclosed in our copending application, Serial Number 687,688, filed September 30, 1957, now abandoned. In the application referred to above a wing assembly, is shown having a plurality of spanwise suction slots provided in the outer surface thereof. One or more of these slots communicate with a suction duct formed internally of the wing via various sized metering orifices, bores or passageways formed in an inner skin of the wing.

In the wing assembly previously referred to, the size or spacing of the metering orifices must necessarily vary in size or their spanwise spacing varied to accommodate changes in differential pressure requirements. These requirements quite often prove troublesome from a manufacturing or servicing standpoint or both. For example, if conventional drill means are utilized to provide the metering orifices, controlling the flow of boundary layer air and said drills are less than six hundredths (.06) of an inch in diameter they will not function satisfactorily due to frequent breakage as compared to drills exceeding this diameter.

Frequently it becomes necessary—in fact mandatory—to provide metering orifices less than six hundredths (.06) of an inch in diameter or the spacing of the orifices must be varied if proper and efficient metering of boundary layer air is to be achieved. If such a condition prevails, drill breakage becomes excessive. Therefore, it will be apparent that this method of achieving regulated removal of boundary layer air is quite unsatisfactory from a manufacturing standpoint. Also, bores of less than six hundredths (.06) of an inch in diameter are quite prone to become clogged or restricted by foreign matter which may be present in the atmosphere. This feature is also quite troublesome from a servicing standpoint.

The structure as disclosed herein, for metering and controlling the removal of boundary layer air, effectively, eliminates the objections encountered by the use of small drills and other objectional features referred to above. Briefly, the metering orifices of the present embodiments are fabricated by a milling operation or of a porus material. In either case they are continuous and are formed by methods which are economical and are easy to fabricate and service and provides other advantages which will become apparent as the disclosure progresses.

Accordingly it is an object of this invention to provide means adapted to selectively remove boundary layer air from various external surfaces of an aircraft which is economical to fabricate and service.

Another object is to provide means adapted to meter and control the removal of boundary layer air from the aircraft surfaces that include means for supporting the outer skin of the aircraft.

Another object is to provide means adapted to remove boundary layer air from aircraft surfaces requiring a minimum space for its installation, which is free of malfunctioning tendencies, which are simple in design and construction, and which may be easily installed in various aircraft structures with negligible additional weight.

Although the characteristic features of the present invention are particularly pointed out in the appended claims, the invention itself, also the manner in which it may be carried out, will be better understood by referring to the following description taken in connection with the accompanying drawings forming a part of this application and in which:

FIGURE 1 is a fragmentary plan view of an airplane wing embodying structure of the type disclosed herein for removing boundary layer air from the external surfaces thereof.

FIGURES 2 and 3 are perspective and cross-sectional views, respectively, of the wing shown in FIGURE 1.

FIGURE 4 is an enlarged view of a portion of the structure shown in FIGURE 3, the view being restricted to that portion of the structure contained within the circle identified by the numeral 4 in FIGURE 3.

FIGURES 5 and 6 are views similar to FIGURE 3 but illustrating other embodiments of the means metering the flow of boundary layer air.

Referring to FIGURES 1, 2 and 3, a portion of an airplane wing 11, including means for removing predetermined quantities of boundary layer air from the surfaces thereof, is shown. The wing 11 includes inner and outer panel-like assemblies 12 and 14, respectively, secured together by stringer members 16 and 17, having a spaced and substantially parallel relation as indicated in FIGURES 2 and 3. Although only the construction immediately adjacent the upper skin of the wing 11 is shown in FIGURES 2 and 3, it is to be understood that this type of construction is typical and is utilized around the major portion of the periphery of the wing. The interior portion of the wing, therefore, defines a cavity, housing fuel containers or the like (not shown), which are completely surrounded by structure of the type shown.

The construction of the inner panel-like assembly 12 constitutes a conventional cellular core structure functioning to strengthen the wing 11 and to define the upper wall of a main suction duct 18 extending generally spanwise of the wing 11. The outer panel-like assembly 14 comprises a conventional cellular core subassembly 19, including a cellular core 21 and plate members 22 and 23 referred to as third and second plate members, respectively, as is best seen in the FIGURES 4-6.

Rows of bores or passageways 24, conforming to a predetermined pattern, are provided in the subassembly 19. The bores 24 extend through the plate members 22 and 23. The individual cell walls of the core 21 function to confine air as it flows between the plate members 22 and 23.

Formed in the member 23 are a plurality of irregularly spaced grooves 26, only one of which is shown in FIGURES 4, 5 and 6. The grooves 26 are characterized in that they extend spanwise of the wing 11 and have a depth which is less than the thickness of the member 23. In the embodiment shown in FIGURE 4, the depth of the groove 26 is less than twenty-five percent (25%) of the thickness of the member 23. This, however, is only illustrative and its depth may vary in accordance with particular design requirements. The cross-sectional configuration of the groove is substantially as shown in FIGURE 4.

Bonded to the exposed surface of the plate member 23 is a plate member 27, the latter constituting the outer skin or first member of the wing 11. It will now be seen that the groove 26 cooperates with the member 27 to define a plenum chamber 28 extending spanwise of the wing 11.

A plurality of grooves 29 functioning to provide fluid communication between the plenum chambers 28 and ambient atmosphere or boundary layer air, are provided in the plate member 27. The grooves 29 extend spanwise of the wing 11 and are off-set in a chord-wise direction with respect to the bores 24. Referring to FIGURE 4, in this embodiment the bottom wall of the groove 26 includes a raised portion 31 located between the bore 24 and slot 29. The portion 31 is characterized in that it includes a flat surface 32 having a parallel relation with respect to and located a predetermined distance below, the lower side surface of the plate member 27.

It will now be apparent that the upper surface 32 of the portion 31 cooperates with the member 27 to define an orifice adapted to meter boundary layer air flowing from the slot 29 to the passageway 24. Accordingly the exact sizes of bore 24 is no longer critical or required in this type of construction. The groove 26 is fabricated by a milling or like operation, particularly the surface 32 of the raised portion 31. In this respect the surface 32 may have a parallel or tapered relation in a spanwise direction with respect to the adjacent surface of the plate member 27. If the surface 32 has a tapered relation with respect to the surface of the member 27, the amount of taper is determined by: (a) the weight flow requirements of boundary layer air to be removed, (b) surface pressures occurring along the surface of the wing 11, and (c) fluid pressures which are present at a specific location in the suction duct 18.

The surface 32 may be elevated at regular or irregular intervals throughout the length of the portion 31. In other words, that part of the portion 31 which is elevated contacts and provides support for the plate member 27 as the latter spans the chamber 28. This type of construction not only insures a sturdier type of construction but enables the member 27 to be fabricated of a thinner and lighter material.

The construction shown in FIGURE 5 is quite similar to that shown in FIGURE 4. The major differences being that the plenum chamber 28 is rectangular in cross-section and the portion 31 (FIGURE 4) is replaced with a porous material constructed of a material that is pervious to air; for example, sintered metal or the like. The material 33 completely extends between the top and bottom walls of the plenum chamber 28 and is located between the slot 29 and bore 24. Accordingly it will be seen that boundary layer air, as it flows between the slot 29 and bore 24, will be effectively metered. It will also be seen that the material 33 provides support for the member 27. It should also be understood that the width indicated by the letter "W" may be varied or tapered in a spanwise direction, thus varying degrees of metering are achieved.

The construction shown in FIGURE 6 is also quite similar to that shown in FIGURE 4. The major differences being that the plenum chamber 28 is rectangular in cross-section and the unitary portion 31 (FIGURE 4) is replaced with an individual member 34 which is impervious to air. The member 34 seats in a groove provided in the lower wall of the chamber 28 and has an edge portion normally having a parallel relation with respect to the adjacent surface of the plate member 27. The height identified by the letter "h" may vary in a spanwise direction. Accordingly the orifice defined in part by the member 34 will meter varying amounts of boundary layer air in accordance with design requirements.

Turning vanes 36 are provided to direct air emitted from the passages 24, so that the air is discharged in a down-stream direction with respect to air flowing in the ducts 18. The vanes 36 preclude turbulent flow in the ducts 18 and function to minimize fluid pressure drop which might otherwise occure therein. The vanes 36 constitute no part of the present invention. Therefore, a further description of the vanes and their function is not considered necessary. A suction pump (not shown) adapted to induce flow in the ducts 18, is positioned adjacent the down-stream end of the ducts 18.

While in order to comply with the statute, the invention has been described in language more or less specific as to structural features. It is to beunderstood that the invention is not limited to the specific features shown, but that the means and construction herein disclosed comprise a preferred form of putting the invention into effect, and the invention is therefore claimed in any of its forms or modifications within the legitimate and valid scope of the appended claims.

What is claimed is:

1. In an aircraft structural assembly incorporating means for removing boundary layer air therefrom, the combination comprising: first and second sheet members joined together in superimposed relation to provide a sub-assembly of said structural assembly; as mounted in said structural assembly the spaced side surfaces of said first and second sheet members constituting outside and inside surfaces, respectively, of said structural assembly; a plenum chamber formed in said second sheet; at least one slot formed in said first sheet member adapted to provide fluid communication between said plenum chamber and atmosphere outside of said assembly; passage means formed in said second sheet having a spaced relation with respect to said slot adapted to provide fluid communication between said plenum chamber and atmosphere inside said structural assembly and restrictor means mounted in said chamber at a location between said slot and passage means adapted to meter fluid flowing through said chamber.

2. Structure as set forth in claim 1: in which said plenum chamber is elongated and said restrictor means includes means adapted to pass varying quantities of fluid throughout the length of said chamber.

3. Structure as set forth in claim 1: in which said chamber is elongated and said restrictor means constitutes an integral portion of said second sheet member extending throughout the length of said chamber.

4. Structure as set forth in claim 1: in which said chamber is elongated and said restrictor means constitutes a porous material pervious to air and extending throughout the length of the chamber.

5. Structure as set forth in claim 4: in which said porous material constitutes a member constructed of sintered metal.

6. Structure as set forth in claim 1: in which said chamber is elongated and said restrictor means constitutes an individual member fabricated of a material that is non-pervious to air and extending throughout the length of said chamber.

7. An aircraft structural assembly incorporating means for removing boundary layer air therefrom comprising: a cellular core assembly including a cellular core and second and third plate members secured to the respective sides of said core in opposed relation: a first plate member constituting the skin of said assembly firmly secured to the exposed side surface of said second plate member and over which air flows when said assembly is in motion; an inner plate-like assembly having a spaced relation with respect to said third plate member and cooperating therewith and other portions of said assembly to define a fluid duct; a plenum chamber formed in said second plate member; at least one slot formed in said first plate member adapted to provide fluid communication between said chamber and ambient atmosphere; passage means in said second and third plate members spaced from said slot and adapted to provide fluid communication between said chamber and said duct; and restrictor means in said chamber positioned between said slot and passage means whereby fluid flow through said chamber is metered upon the application of suction to said duct means.

8. Structure as set forth in claim 7: in which said plenum chamber is elongated and said restrictor means includes means adapted to pass varying quantities of fluid throughout the extent of said chamber.

9. Structure as set forth in claim 7: in which said chamber is elongated and said restrictor means constitutes an integral portion of said second plate member extending throughout the length of said chamber.

10. Structure as set forth in claim 7: in which said chamber is elongated and said restrictor means constitutes a porous material pervious to air and extending throughout the length of the chamber.

11. Structure as set forth in claim 7: in which said chamber is elongated and said restrictor means constitutes an individual member fabricated of a material that is nonpervious to air extending throughout the length of said chamber.

References Cited by the Examiner

UNITED STATES PATENTS

| | | | |
|---|---|---|---|
| 2,742,247 | 4/56 | Lachmann | 244—130 |
| 2,925,231 | 2/60 | Pfaff et al. | 244—42 |
| 2,941,759 | 6/60 | Rice et al. | 165—134 |
| 3,117,751 | 1/64 | Rogers et al. | 244—42 |

MILTON BUCHLER, *Primary Examiner*.

CHARLES SUKALO, *Examiner*.